May 26, 1959
T. H. THOMAS
2,888,035
CHECK VALVE
Filed May 3, 1956
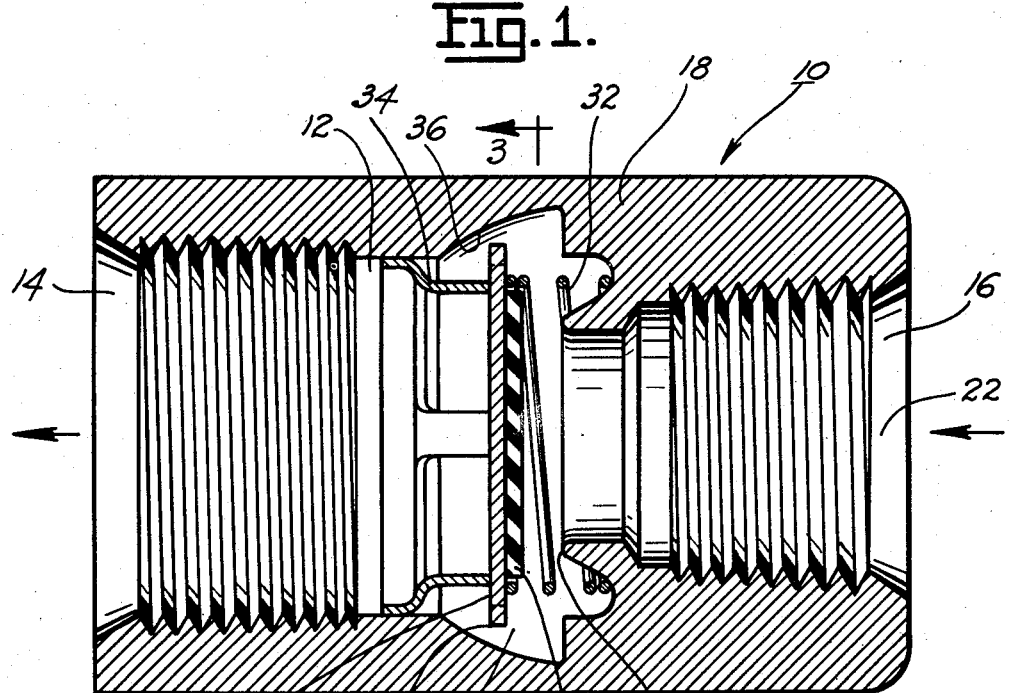
Fig.1.
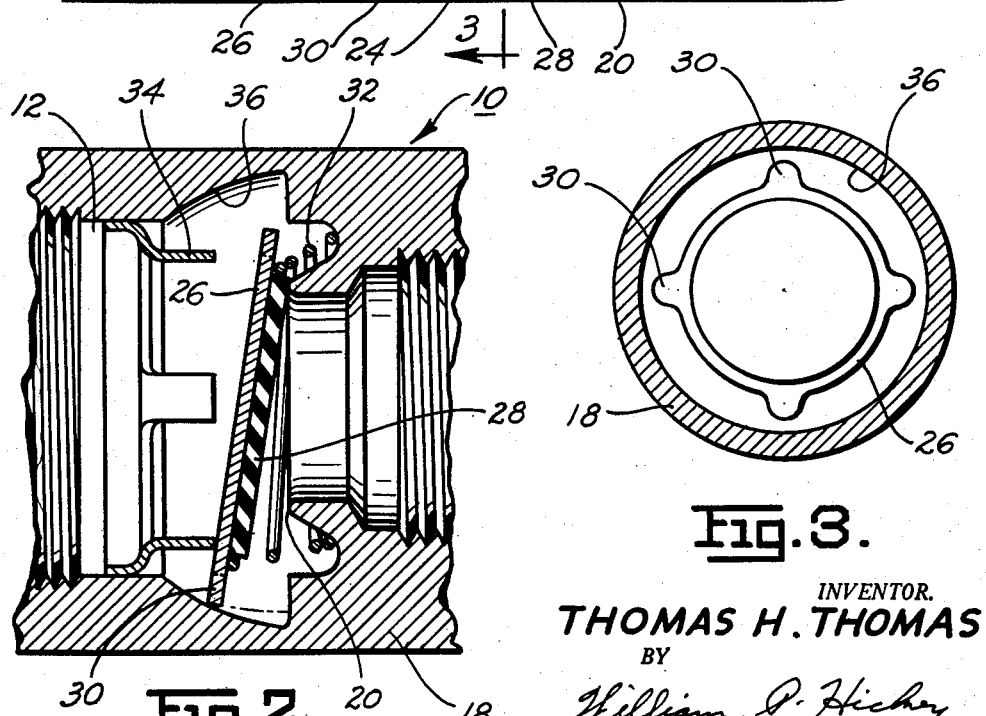
Fig.2.
Fig.3.
INVENTOR.
THOMAS H. THOMAS.
BY
William P. Hickey
ATTORNEY.

United States Patent Office 2,888,035
Patented May 26, 1959

2,888,035

CHECK VALVE

Thomas H. Thomas, South Bend, Ind., assignor to Bendix Aviation Corporation, South Bend, Ind., a corporation of Delaware Application May 3, 1956, Serial No. 582,437

9 Claims. (Cl. 137—517)

The present invention relates to valves generally; and more particularly to check valves.

An object of the present invention is the provision of a new and improved check valve structure which is simple in design, rugged in construction, and inexpensive to manufacture.

Another object of the present invention is the provision of a new and improved valve of the type having a valve closure member adapted to be forced into engagement with a valve seat by backward flow through said valve, said valve having surfaces adjacent said valve seat which supports the closure member in its off the seat position in such manner that the backflow produces valve closure movement in two stages—the first stage being a tilting movement wherein a first portion of the closure member is brought into engagement with the valve seat, and a second stage wherein the closure member pivots about said first portion to come into uniform engagement with said seat—said surfaces being so designed that the closure member moves out of engagement with said supporting surfaces during its second stage of movement.

A further object of the invention is the provision of a new and improved valve comprising a valve body having a flow chamber therein, an annular valve seat therein, a valve closure member in said chamber for abutment with said valve seat, the side walls of said chamber being so positioned as to support one side edge of said valve closure member in its off-seat position while a generally diametrically opposed portion of said valve closure member abuts said valve seat, and being so shaped as to provide negative interference with said side edge of the valve closure member as the valve closure member pivots about said generally diametrically opposed portion to move into uniform engagement with said valve seat.

A still further object of the invention is the provision of a new and improved valve comprising a valve body having an axially extending chamber therein, a valve seat in said chamber generally perpendicularly positioned with respect to said axis, a valve closure member in said chamber positioned forwardly of said valve seat and adapted to abut said valve seat, the side walls of said chamber forwardly of said valve seat having portions spaced about said axis which when revolved about said axis generate a surface of revolution the center of curvature of which falls generally rearwardly of the abutment surface of said valve seat.

The invention resides in certain constructions and combinations and arrangement of parts and further objects and advantages will be apparent to those skilled in the art to which the invention relates from the following description of the preferred embodiment described with reference to the accompanying drawing forming a part of this specification and in which:

Figure 1 is a longitudinal cross-sectional view of a check valve embodying the principles of the present invention;

Figure 2 is a fragmentary longitudinal cross-sectional view of the valve shown in Figure 1 showing its operative parts in slightly different position; and Figure 3 is a cross-sectional view taken upon the line 3—3 of Figure 1.

With reference to Figure 1 of the drawing, there is shown a valve body 10 provided with a central chamber 12 communicating with threaded ports 14 and 16. The valve body is formed with side walls 18 shaped to provide an annular valve seat 20 intermediate the ports 14 and 16. The valve seat is positioned generally perpendicularly with respect to the axis 22, and projects forwardly into an enlarged portion 24 of the central chamber 12.

Enlarged portion 24 of the valve chamber 12 houses a generally disc shaped valve closure member 26 the rear surface of which is coated with a resilient material 28 adapted to provide sealing engagement with respect to the annular valve seat 20. The generally disc shaped valve closure member 26 is provided with four radial projections or ears 30 which are so shaped and positioned as to permit valve closure member 26 to be inserted into the enlarged portion of the chamber 24 through the front end of the internal valve chamber 12. A coil spring 32 is positioned between the back surface of the enlarged portion 24 and the valve closure member 26, and an abutment ring 34 is pressed into the front end of the chamber 12 to retain the valve closure member 26 within the enlarged portion 24 of the internal valve chamber.

According to the provisions of the present invention, the valve supporting portion 36 of the side walls 18 forming the radially outer surfaces of the enlarged portion 24 of the internal valve chamber 12 are formed in such manner as to support the valve closure member in a position relative to its valve seat, wherein backward fluid flow through the valve chamber will always bring one portion of the resilient coating 28 into engagement with the annular valve seat 20; and wherein subsequent backflow through the valve chamber causes the valve closure member to pivot about the portion in abutment with the valve seat 20 to bring the coating 28 into uniform engagement with the valve seat 20 without dragging any portion of the side edge of the valve closure member 26 across the side walls 36 of the valve chamber.

In the preferred embodiment shown in the drawing, the surface of the side wall portion 36 is a surface of revolution the center of curvature of which falls upon the longitudinally extending axis 22 generally rearwardly of the valve seat 20 and in fact is a spherical surface.

Assume for the moment that the check valve 10 is installed horizontally and that the weight of the valve closure member 26 is sufficient to overcome spring 32 such that the bottom edge of the valve closure member 26 will be supported on the surface 36 when the valve closure member is moved out of engagement with its valve seat by forward flow through the check valve in the direction indicated by the flow arrows. Initial backward or return flow through the check valve will, as shown in Figure 2, cause the upper end of the valve closure member 26 to tilt rearwardly and engage the top most portion of the valve seat 20; and any additional backward flow thereafter will swing the valve closure member 26 about the top portion previously forced into engagement with the valve seat and cause the valve closure member 26 to uniformly engage the valve seat. The second or final stage of valve closure movement causes the bottom portion of the valve closure member to move out of engagement with the side walls 18 of the internal valve chamber as shown by the dot-dash lines of Figure 2—such that at no time during this final stage of valve closure movement is the valve closure member restrained by engagement or rubbing against the side walls 36 of the valve chamber. This result is, of course, achieved by reason of the shape of the side walls 36 which shape provides negative interference with the path of the bottom portion of the valve closure member during the final stage of valve closure movement. Stated in slightly different manner, the side walls 36 recede away from the path of the bottom edge of the valve closure member during the second stage of valve closure movement.

While the preferred embodiment has been described as utilizing a spherical surface for achieving the desired results the invention is not so limited. Other type of surfaces can be used to support the valve closure member in its off position provided these surfaces recede away from the side edges of the valve closure member during the second stage of valve closure movement. These surfaces may include surfaces of revolution having a changing radius of curvature and may even include a properly designed conical surface. In describing the position of the center of curvature of the surface 36, it was stated that the center of curvature was positioned "generally rearwardly" of the abutment surface of the valve seat 20. Where a considerable thickness of resilient material is used, the center of curvature may be made to fall slightly forwardly of the valve seat 20. The expression "generally rearwardly of" as applied to the location of the center of curvature for the valve supporting surface with respect to the valve seat will for the purposes of this specification be understood to include all instances wherein the radius of curvature of the valve supporting surface falls rearwardly of the angle at which the valve supporting surface supports the valve closure member relative to its valve seat.

While the present invention has been set forth in considerable detail, I do not wish to be limited to the particular construction shown which may be varied within the scope of the invention, and it is the intention to cover hereby all adaptations, modifications and arrangement thereof which come within the practice of those skilled in the art to which the invention relates.

I claim:

1. In a valve: a valve body having an internal flow chamber therein; an annular valve seat facing into said internal flow chamber; a generally disc-shaped closure member positioned in said flow chamber for abutment with said valve seat, said closure member having an abutment surface adjacent its radially outer edges for supporting said closure member laterally with respect to said valve seat; a supporting surface in said flow chamber spaced laterally of said valve seat for engagement by said abutment surface of said closure member for laterally supporting said closure member in the region overlying said valve seat, said valve closure member being retained in said chamber in a manner permitting tilting movement about a point of engagement of said abutment surface with said supporting surface to thereafter bring a spaced point of said closure member into abutment with a portion of said valve seat that is spaced generally diametrically of said first mentioned point of engagement, the configuration of said supporting surface being such that the tangent to any point thereon adapted to be abutted by said closure member forms a more acute angle with respect to the plane of said valve seat than does a normal to said valve closure member at its point of contact with said supporting surface when it is tilted up against said valve seat, whereby subsequent pivotal action of said closure member with respect to said diametrically positioned portion of said valve seat bringing the closure member into complete abutment with said valve seat causes said engaging point of said closure member to move clear of said supporting surface.

2. A valve constructed in accordance with claim 1 characterized further in that said supporting surface is an arcuate surface whose center of curvature falls generally on or to the opposite side of the plane of said valve closure member when it is in complete abutment with said valve seat.

3. A valve constructed in accordance with claim 1 characterized further in that said supporting surface is at least a portion of a surface of revolution that is generally concentric with said valve seat and whose center of curvature falls generally on or to the opposite side of the plane of said valve seat from said valve closure member.

4. A valve constructed in accordance with claim 1 wherein the side walls of said flow chamber are the supporting surface, said sidewalls being a segment of a sphere whose center is positioned generally concentrically with said valve seat and is positioned generally on or to the opposite side of the plane of said valve seat from said valve closure member.

5. In a valve: a valve body having a flow chamber therein terminated by a rear wall; an annular valve seat in said rear wall of said valve body; a valve closure member having side edges for tiltably supporting said member in said chamber for abutment with said valve seat; support surfaces for said closure member located generally forwardly and laterally of said valve seat for supporting one side edge of said valve closure member while a generally diametrically opposed portion of said valve closure member abuts said valve seat, said support surfaces having a shape which recedes away from the path of said side edge of said closure member as the valve closure member pivots about its generally diametrically opposed portion to move into uniform engagement with said valve seat.

6. A valve constructed in accordance with claim 5 characterized further in that said support surfaces form the side walls of said flow chamber.

7. In a valve: a valve body having a flow chamber therein terminated by a rear wall; an annular valve seat in said rear wall of said valve body; a valve closure member having side edges for tiltably supporting said member in said chamber for abutment with said valve seat; support surfaces for said closure member located generally forwardly and laterally of said valve seat for supporting one side edge of said valve closure member while a generally diametrically opposed portion of said valve closure member abuts said valve seat; said support surfaces having a contour whose tangent with respect to an imaginary line normal to said valve seat will always be greater than the angle formed between said imaginary line and the tangent to the path of said side edge of said valve closure member when the valve closure member pivots about its generally diametrically opposed portion that abuts said valve seat to move into uniform engagement with said valve seat.

8. A valve constructed in accordance with claim 7 characterized further in that said support surfaces form the side walls of said flow chamber.

9. A valve constructed in accordance with claim 7 characterized further in that said support surfaces are surfaces of revolution forming the side walls of said flow chamber.

References Cited in the file of this patent

UNITED STATES PATENTS

| | | |
|---|---|---|
| 690,046 | Bickel | Dec. 31, 1901 |
| 1,328,057 | Ryan | Jan. 13, 1920 |
| 1,999,269 | Anderberg | Apr. 30, 1935 |
| 2,208,188 | Johnston | July 16, 1940 |
| 2,223,944 | Roy | Dec. 3, 1940 |

FOREIGN PATENTS

| | | |
|---|---|---|
| 718,653 | Great Britain | Nov. 17, 1954 |